Dec. 29, 1936.  E. V. J. TOWER  2,065,631
CLUTCH CONSTRUCTION
Filed Aug. 9, 1934  3 Sheets-Sheet 1
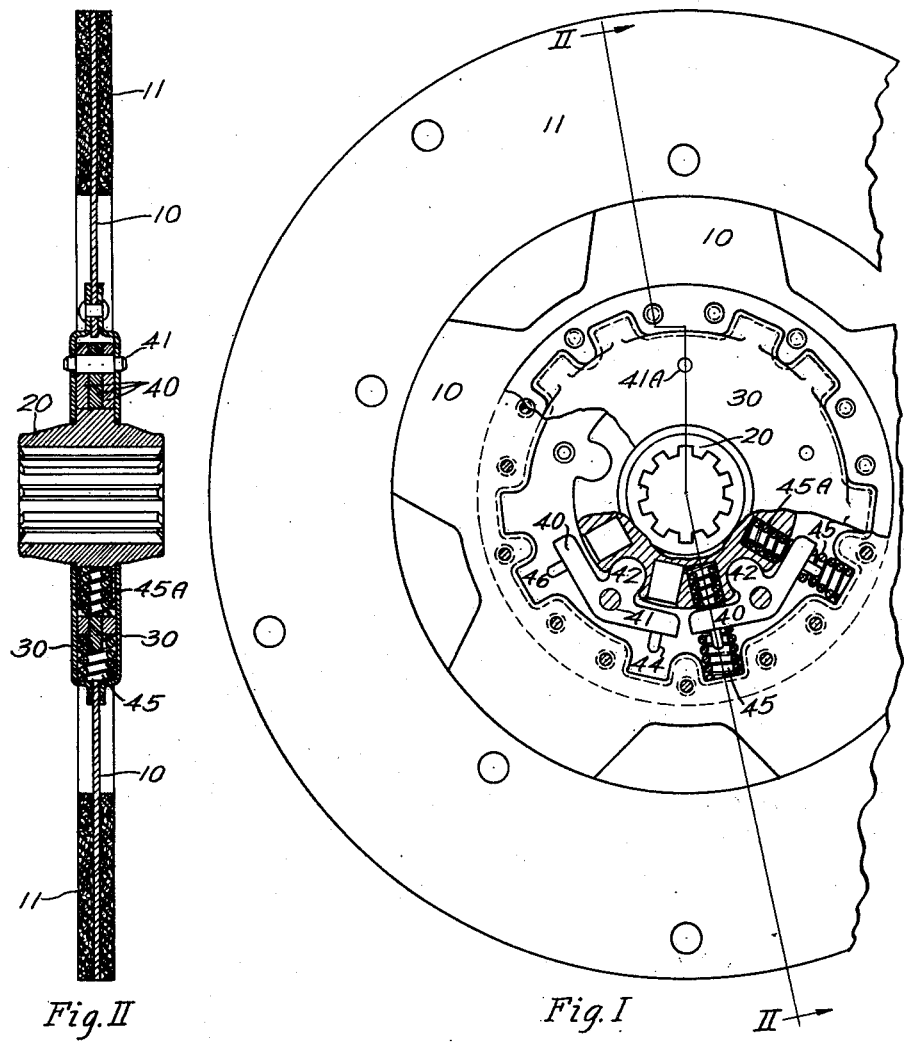
Fig. II  Fig. I
Elmer V. J. Tower.
INVENTOR.
BY
Carroll R. Taber
ATTORNEY.

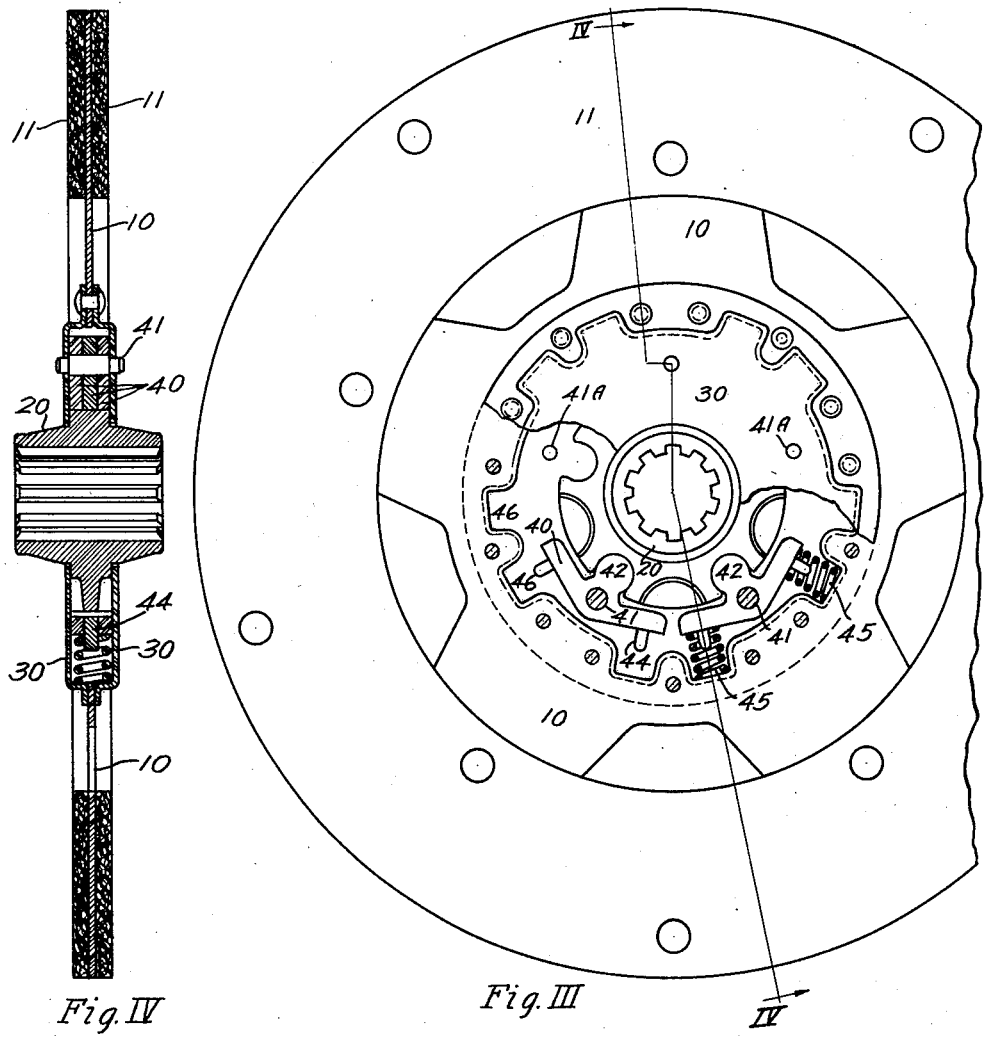

Dec. 29, 1936.  E. V. J. TOWER  2,065,631
CLUTCH CONSTRUCTION
Filed Aug. 9, 1934  3 Sheets-Sheet 3
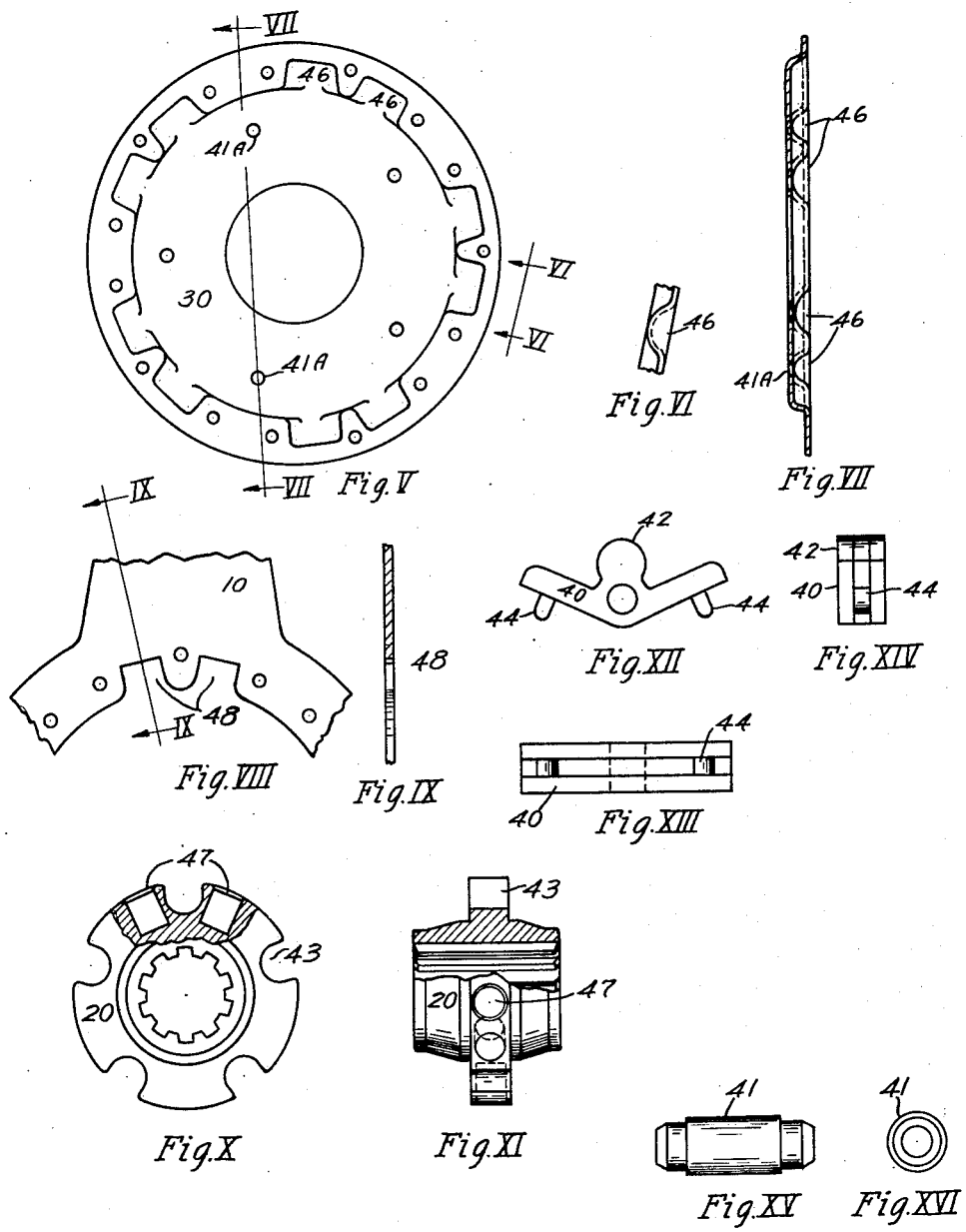
Elmer V. J. Tower. INVENTOR.
BY Carroll R. Taber ATTORNEY.

Patented Dec. 29, 1936

2,065,631

UNITED STATES PATENT OFFICE 2,065,631

CLUTCH CONSTRUCTION

Elmer V. J. Tower, Lansing, Mich., assignor to Motor Wheel Corporation, Lansing, Mich., a corporation of Michigan Application August 9, 1934, Serial No. 739,057

5 Claims. (Cl. 192—68)

This invention relates to vibration dampeners for power transmitting elements of the flexible type constructed to dampen and absorb torsional vibration between the driving element and the driven element of the power transmitting device.

The general purpose of such mechanism is to permit the driving of one element by the other, but at the same time to absorb or diminish the torsional vibration and sudden load shocks.

Such vibration dampeners as referred to, have a particular utility when used in a clutch mechanism, more especially the type of clutch employed in automobiles driven by internal combustion engines. Such engines tend to develop torsional vibration which is transmitted through the clutch disk to the driven shaft connected with the transmission gears, and while the invention herein described is particularly useful in an automobile clutch of the kind referred to, its utility is not limited thereto.

In vibration dampeners of the kind used in automobile clutches, the clutch operates upon a disk to drive the disk by frictional contact, and this disk is mounted yieldably upon a central hub which in turn is connected to the transmission shaft of the vehicle.

Interposed between the disk and the hub are spring devices which serve as the flexible driving connection between the driving disk and the driven hub, whereby to absorb or diminish the torsional vibrations referred to, and also provide a cushioning effect against sudden shock loads.

In a normal driving operation, the disk is the driving member and the hub is the driven member; but when the vehicle is coasting, the hub may become the driving member and then the disk is the driven member; so that it becomes important to absorb or diminish the torsional vibrations which arise in either case, that is, normal driving conditions or coasting conditions.

The general requirements of such vibration dampeners are now well known and they present problems which are well recognized in this field.

It is the particular purpose of the present invention to provide novel forms and locations of the springs and their operating members; and in particular to provide means whereby the circumferential twist or torque between the hub and the disk, can, by the combination of the intervening spring-operating members, be converted into a radial pressure against the springs.

With these and other objects in view, the improvements are shown in the accompanying drawings in which:

Figure I represents a plan view of a clutch disk and hub member showing a set of four radially positioned coil springs associated with each set of oscillating rocker arms;

Figure II is a sectional view taken on substantially the line II—II of Figure I;

Figure III represents a plan view of a clutch disk and hub member showing a set of two radially positioned coil springs associated with each set of oscillating rocker arms;

Figure IV is a sectional view taken on substantially the line IV—IV of Figure III;

Figure V is a plan view of one of the side plates associated with the clutch disk;

Figure VI is a fragmentary view of the plate shown in Figure V taken on substantially the line VI—VI of that figure;

Figure VII is a sectional view taken on substantially the line VII—VII of Figure V;

Figure VIII is a fragmentary side view of a central portion of the disk illustrated in Figures I and III;

Figure IX is a sectional view taken on substantially the line IX—IX of Figure VIII;

Figure X is a plan view of the hub forming a part of the construction illustrated in Figure I with portions broken away to show the coil spring receiving recesses;

Figure XI is an end view of the hub shown in Figure X with portions broken away to show the interior thereof;

Figure XII is a side view of the oscillating rocker arm assembly shown in Figures I and III;

Figures XIII and XIV are detailed views of the rocker arm assembly;

Figure XV is a side view of the pivot pin upon which the rocker arm assemblies are mounted, as illustrated in Figures II and IV; and Figure XVI is an end view of the pivot pin illustrated in Figure XV.

Referring to Figures I and II, the clutch disk to which the present inventions are applied is in the usual circular form comprising a main plate or disk formed with spokes 10 terminating in a peripheral rim to which are riveted the annular friction facings 11. These friction facings are engaged by the main moving member of the clutch so as to be driven thereby and in this respect the main disk and spoke members 10 may be considered as the driving member of this vibration dampener since it normally operates to drive the hub member upon which this disk member is yieldably mounted.

The hub is shown in detail in Figures X and XI and comprises a fluted member 20 which is suitably splined to receive interiorly thereof the shaft upon which it is mounted so that when the hub member and shaft are driven, the rotation of the shaft can be transmitted to the transmission gears in a well known manner.

In order to form the connection between the driving disk and the driven hub, two side plates 30 are provided such as shown in Figures V, VI and VII. These side plates are riveted to the main disk, one on each side thereof, as shown in Figure II, and the inner periphery of these side plates is seated to turn loosely upon the outer circumference of the shank of hub 20.

Thus, the main driving disk is mounted to turn freely upon the hub or driven member and is adapted to have a limited relative turning movement in either direction under the control of the dampener devices now to be described.

These dampener devices comprise sets of oscillating rocker arms or bell-crank levers 40 such as shown in the cutaway portions of Figures I and III and in detail in Figures XII, XIII and XIV, also certain spring devices cooperating with said bell-crank levers. The rocker arms 40 are preferably laminated, being shown as made up of three separate sections (see Figs. XIII and XIV).

There are in the present case five sets of these rocker arms or bell-crank levers located at definitely spaced intervals between the supporting side plates and held in place between the side plates by the pivot shafts 41 which are suitably socketed in corresponding apertures 41a formed in the side plates so as to permit a slight rocking movement of these rocker arms or bell-crank levers 40 in either direction within a limited range.

It will be seen that these rocker arms are in the form of double bell-crank levers, and the central or common arm 42 of each of these rocker arms is formed with a rounded surface adapted to project and fit into corresponding flutes 43 formed in the periphery of the hub member 20. (See Figures X and XI.)

These rocker arm sets are of the total width shown in Figures II and IV, so as to substantially fill in the space between the side plates. The oppositely extending arms of one of the rocker arms is provided with integral projecting pilots 44 which serve to station the coil springs 45, which springs thus intervene between the outer ends of the rocker arms and sockets 46 formed in the side plates 30. These sockets are shown more clearly in Figures V and VII.

For heavy duty service springs 45a are located opposite the springs 45 (see Figures I and II). These springs are seated in recesses 47 formed in the hub member 20 (see Figs. X and XI). Thus there are two sets of pairs of springs for each set of rocker arms, one pair being located on opposite sides of the end of one of the arms, and the other pair being located on opposite sides of the end of the other arm. For lighter service the springs 45a may be dispensed with as illustrated in Figures III and IV, in which case the hub 20 need not be provided with the recesses 47.

While there are spring sockets 46 formed in the side plates 30, for seating and enclosing the springs 45, the main plate 10 is cut away (as shown in Figure VIII) to form notches 48 which cooperate with the sockets 46 in plates 30 to provide cylindrical pockets for the springs 45.

The operation of this device is as follows:—

Assuming that in Figure I this vibration dampener is being rotated in a clockwise direction due to contact of the friction facings 11 with the clutch element, then the rotation of the main plate together with the side plates 30 riveted thereto (also turing in clockwise direction) will through these side plates and the shouldered pivot pins 41 of the rocker arms, acts upon the hub or driven member to turn the latter also in clockwise rotation against the resistance of springs 45 and 45a. All five sets of the rocker arms take part in this movement.

This transmitting of the driving movement of the main disk to the central hub member is effected by the pressure of the central arm 42 of each set of rocker arms against the opposing wall of the flutes 43 formed in the hub member.

Referring to the broken away portion of Figure I it is apparent that the clockwise rotation of the rocker arms will cause the left face of the arm 42 to bear against its corresponding surface of the flute 43, and in thus exerting pressure upon the turning the hub member, the rocker arm will be rotated about its pivot pin 41 in a clockwise direction of rotation so that the right hand spring 45 is compressed by the downward movement of the right arm of this bell-crank lever; while the left arm of the bell-crank is rocked upward in Figure I and compresses its spring 45a.

Thus this pair of springs, 45 and 45a, as just referred to, are compressed radially with respect to the center of the hub member so that the circumferential turning movement of the disk assembly is thereby converted into substantially a radial pressure against these springs whereby to absorb torsional vibration and provide a cushioned yield between the two members. Where only one set of springs is used with each set of rocker arms as illustrated in Figures III and IV, one of the springs 45 serves as the cushioning and dampening means for each set of rocker arms.

As is well known in vibration dampeners of this character, there are times when the hub member becomes the driving member, such for example as when the vehicle is coasting.

In such cases the clockwise rotation of the hub member now causes pressure to be exerted upon the right hand surface of the central arm 42 and the main disk assembly is driven in clockwise rotation through the coaction of arms 42 and pivot pins 41; but in this case the rocker arms are rotated slightly and in anti-clockwise direction so that the left arm of the bell-crank in Figure I is now pressed outward against its lower spring 45, while the right arm is pressed inward against its spring 45a.

It will thus be seen that the character and compression load range of these springs, thus arranged in pairs, can be varied to suit the various conditions required for any desired vibration dampening effects in either direction. The pair which become effective for the coasting movement can be made with characteristics which are different from the pair utilized for the normal driving operation. And in either direction of movement the springs are compressed in a direction substantially at right angles to the direction of the drive torque; that is, the springs are compressed radially while the driving torque is in a circumferential direction.

Referring again to Figure I it will be seen that when the relative motion occurs between the fluted grooves 43 of the hub member and the inserted semi-spherical arm ends 42 of the bell-crank levers, the bearing portion of the hub flute gradually changes toward the outer end of the rounded arm 42 so as thereby to vary the effective operating length of the central lever arm 42. This change in the length of this lever arm correspondingly varies the effective resistance of the springs which bear upon the extremities of the two arms of the bell-crank lever.

Various advantages of this improved form of vibration dampener and cushioning drive will be apparent to those who are familiar with the requirements and uses of devices of this sort. Amongst these advantages, in addition to what has already been referred to, are the following features:—

The operating yield range of the dampener may be made either comparatively easy and substantially constant or stiff with more variable characteristics in order to meet the maximum amplitudes of vibration for any motor at its most critical speeds, and then the operating range will gradually "tighten up" and offer more resistance to further yield and eliminate excessive "wind up" in the final drive system of the vehicle.

Also the arrangement of parts in the present improved device lessens the possibility of damage arising from breakage or dislodgment of any of the dampener parts.

The main plate member, as well as the opposing reinforcing side plates may be fabricated from stampings in a strong and effective manner, yet very light in total weight of assembly.

The radial mounting of the coil springs is of further great advantage insofar as concerns the natural action of the centrifugal force due to high speed rotation.

The outer springs may be of substantial structure with heavy range capacity as these are stationed at a substantially increased radius from the hub center. The effects of breakage of any one spring is of lessened importance. The springs also find their own natural seats in operation due to the flexibility of the laminated sets of lever ends.

All of the spring devices and dampening mechanism are completely enclosed, and this enclosure may be utilized for suitable lubrication; and all the dampener mechanism is centrally stationed within the unit.

A mechanical and manufacturing advantage is provided by making the rocker arms in laminated form as described.

The leverage ratio of the rocker arms is also highly advantageous,—that is, the ratio between the length of the central arm of the bell-crank rocker arm, and the length of the two extended side arms. This provides for mechanical control of the desired proportion of the total direct torque to be transmitted through the leverage combination to the springs and permits the use of lighter springs than are otherwise possible without the mechanical advantage of approximately a 2 to 1 ratio.

The ball-shaped contour of the central arm of the rocker arms is also advantageous as affording an improved construction for its operating requirements.

The spring clusters for each of the rocker arm sets are preferably assembled under initial tension so that complete maximum oscillation of the arms in either direction will not entirely unload the spring at the other end. All natural compression forces of the springs are automatically and uniformly balanced in neutral position.

The mechanisms herein shown and described constitute a preferred form of embodiment of the inventions, and modifications thereof may be made without departing from the scope of the inventions as set forth in the appended claims. It is, of course, obvious that this same dampener construction may be employed in any commercial size of clutch disk and made to accommodate any standard commercial size of hub member as used in automotive practice.

Further, the same basic design is readily adaptable to aeronautical practice, such as cushioning a propeller at its hub mounting or as a yieldable control member for so-called knee-action mechanisms for modern designed motor vehicles.

I claim:

1. A vibration dampener comprising a hub, a disk element mounted on the hub with provision permitting relative angular movement between the hub and the disk, spring devices between the disk and hub for absorbing vibrations between the two, and spring operating members for connecting the disk and hub through said spring devices, said spring operating members being in the form of double bell crank levers, said spring devices being arranged with respect to said levers in pairs, one pair being located on opposite sides of one end of said double bell crank lever and the other pair located on opposite sides of the other end of the bell crank lever whereby said four springs absorb the vibrations between the disk and the hub in either direction of rotation.

2. A vibration dampener including, in combination, a hub, a disk mounted upon the hub for angular movement with respect thereto, and resilient means for limiting said angular movement comprising: an operating arm mounted on one of said parts to be actuated upon relative movement of said hub and disk, the hub and disk provided with radially aligned recesses at opposite sides of said arm, and a compressed coil spring loosely mounted in each of said recesses to oppose the movement of said arm in either direction of rotation.

3. A vibration dampener including, in combination, a hub, a disk mounted upon the hub for angular movement with respect thereto, and means for limiting said angular movement comprising a double bell crank lever having a pair of operating arms pivotally mounted upon said disk, said bell crank lever having a connection with said hub whereby the lever is rotated upon relative movement of the hub and disk, the hub and disk provided respectively with radially aligned recesses at the opposite sides of each of said operating arms, and a compressed coil spring loosely mounted in each of said recesses in contact with said operating arms to oppose the movement of said arms in either direction.

4. A vibration dampener including, in combination, a hub, a disk mounted upon the hub for angular movement with respect thereto, and means for limiting said angular movement comprising a bell crank lever having an operating arm pivotally mounted upon said disk, said bell crank lever having a connection with said hub whereby the lever is rotated upon relative movement of the hub and disk, the hub and disk being provided respectively with radially disposed recesses at the opposite sides of said operating arm, and a spring element mounted in each of said recesses in contact with said operating arm.

5. A vibration dampener including, in combination, a hub, a disk mounted upon the hub for angular movement with respect thereto, and means for limiting said angular movement comprising a bell crank lever having an operating arm pivotally mounted upon said disk, said bell crank lever having a connection with said hub whereby the lever is rotated upon relative movement of the hub and disk, and compressed coil springs respectively mounted on said hub and disk and disposed in radial alignment on opposite sides of said operating arm in contact therewith to oppose movement of said arm.

ELMER V. J. TOWER.